L. LEWIS.
Balance Level and Plumb.
No. 956.
Patented Oct. 3, 1838.
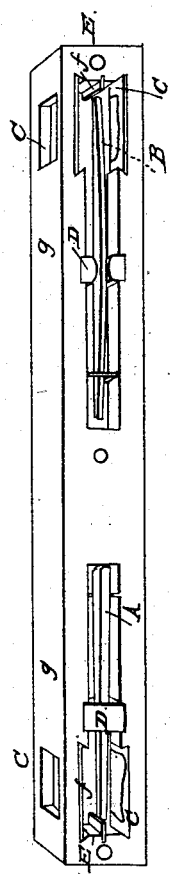

UNITED STATES PATENT OFFICE.

LEMUEL LEWIS, OF NEWFIELD, NEW YORK.

BALANCE AND PENDULUM LEVEL AND PLUMB.

Specification of Letters Patent No. 956, dated October 3, 1838.

*To all whom it may concern:*

Be it known that I, LEMUEL LEWIS, of Newfield, in the county of Tompkins and State of New York, have invented a Balance Level and Plumb; and I do hereby declare that the following is a full and exact description.

In the accompanying drawing the cover is removed to show the internal arrangement.

To enable others skilled in the art to make and use my invention I will proceed to describe its construction and operation.

I make a box of wood $g$ or any other suitable material of any convenient size, say two feet long, and two inches high by one and a half broad. Near each end of the box in both sides I insert glass lights $c$ of any suitable size, say one inch long by three fourths of an inch high, the plumb A is a piece of iron suspended on a pivot at the center D say about two inches from the lights in one end of the box heaviest at the lower end, and pointed at the upper end, pointing when the instrument is perpendicular to a mark $f$ on a trap plate E in the end of the interior of the box. The level B is also a piece of iron hung upon a pivot at the center D′ at about the same distance from the lights in the other end of the box made of equal size at the two ends so as to balance on the pivot, also pointed at the outer end, and when level, this points directly to a mark $f$ in a trap plate E′ at this end of the interior of the box. When used as a level the box is to be laid horizontal, when as a plumb it is to be placed in a perpendicular position, and when necessary to show the internal arrangement, a cover is removed which is attached to one of its sides.

What I claim as my invention and desire to secure by Letters Patent is—

The so hanging the level and plumb on pivots in the box or case as to have them indicate the true level and perpendicular by their pointing to the marks on the trap plates in the ends all as above described.

LEMUEL LEWIS.

Witnesses:
AUGUST SHERRILL,
A. C. HALL.